US007764095B2

(12) United States Patent
Werner et al.

(10) Patent No.: US 7,764,095 B2
(45) Date of Patent: *Jul. 27, 2010

(54) CLOCK DISTRIBUTION NETWORK SUPPORTING LOW-POWER MODE

(75) Inventors: Carl Werner, Los Gatos, CA (US); Ely Tsern, Los Altos, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/151,295

(22) Filed: May 5, 2008

(65) Prior Publication Data

US 2008/0303568 A1 Dec. 11, 2008

Related U.S. Application Data

(63) Continuation of application No. 11/318,290, filed on Dec. 22, 2005, now Pat. No. 7,368,961.

(51) Int. Cl.
*H03L 7/06* (2006.01)

(52) U.S. Cl. ...................................... 327/158; 327/295

(58) Field of Classification Search ................ 327/158, 327/295
See application file for complete search history.

(56) References Cited

U.S. PATENT DOCUMENTS

| | | | | | |
|---|---|---|---|---|---|
| 5,428,317 | A | * | 6/1995 | Sanchez et al. | 331/1 A |
| 5,751,665 | A | * | 5/1998 | Tanoi | 368/120 |
| 5,764,710 | A | * | 6/1998 | Cheng et al. | 375/371 |
| 6,075,392 | A | * | 6/2000 | Sandner | 327/145 |
| 6,111,448 | A | * | 8/2000 | Shibayama | 327/293 |
| 6,477,657 | B1 | * | 11/2002 | Kurd et al. | 713/501 |
| 6,600,345 | B1 | * | 7/2003 | Boutaud | 327/99 |
| 6,608,530 | B1 | | 8/2003 | Green et al. | |
| 6,639,449 | B1 | * | 10/2003 | De La Cruz et al. | 327/407 |
| 6,647,081 | B2 | * | 11/2003 | Butler et al. | 375/376 |
| 6,661,736 | B2 | * | 12/2003 | Magoshi | 365/233.14 |
| 6,696,829 | B1 | | 2/2004 | Nguyen et al. | |
| 6,700,421 | B1 | | 3/2004 | Mirov et al. | |
| 6,720,810 | B1 | * | 4/2004 | New | 327/158 |
| 6,774,681 | B2 | * | 8/2004 | Dellow et al. | 327/99 |
| 6,798,259 | B2 | * | 9/2004 | Lin | 327/153 |
| 6,806,755 | B1 | * | 10/2004 | Simmonds | 327/298 |

(Continued)

OTHER PUBLICATIONS

U.S. Appl. No. 11/318,290, filed Dec. 22, 2005, Werner.
Johnson, Mark G. et al., "A Variable Delay Line PLL for CPU-Coprocessor Synchronization." IEEE Journal of Solid-State Circuits, vol. 23, No. 5, Oct. 1998. pp. 1218-1223.

(Continued)

*Primary Examiner*—Kenneth B. Wells
(74) *Attorney, Agent, or Firm*—Silicon Edge Law Group LLP; Arthur J. Behiel

(57) ABSTRACT

A clock distribution network locks a local clock signal to a reference clock signal using a first feedback loop associated with a synchronization circuit (e.g., a PLL or a DLL). The local clock signal can then be selectively distributed to a plurality of clock destination nodes via a clock network. Clock distribution may be disabled as needed to save power. The first feedback loop is active irrespective of whether clock distribution is enabled. The delay through the clock network may drift due to temperature and supply-voltage fluctuations, which introduces phase errors in the distributed clock signals. A second feedback loop is activated when clock distribution is enabled to compensate for this drift.

19 Claims, 4 Drawing Sheets

U.S. PATENT DOCUMENTS

| | | | | |
|---|---|---|---|---|
| 6,809,556 | B1 * | 10/2004 | Bronfer et al. | 327/99 |
| 6,809,600 | B2 | 10/2004 | Chang et al. | |
| 6,812,753 | B2 * | 11/2004 | Lin | 327/155 |
| 6,839,301 | B2 * | 1/2005 | Lin et al. | 365/233.12 |
| 6,882,195 | B2 * | 4/2005 | Bui et al. | 327/161 |
| 6,897,699 | B1 | 5/2005 | Nguyen et al. | |
| 6,927,604 | B2 * | 8/2005 | Boerstler et al. | 326/93 |
| 6,927,638 | B2 | 8/2005 | Glenn | |
| 7,009,407 | B2 * | 3/2006 | Lin | 324/601 |
| 7,042,259 | B2 * | 5/2006 | Kurd et al. | 327/147 |
| 7,126,407 | B2 * | 10/2006 | Furtner | 327/298 |
| 7,164,296 | B2 * | 1/2007 | Biswurm et al. | 327/99 |
| 7,368,961 | B2 * | 5/2008 | Werner et al. | 327/156 |

OTHER PUBLICATIONS

Moon, Yongsam, et al., "An All-Analog Multiphase Delay-Locked Loop Using a Replica Delay Line for Wide-Range Operation and Low-Jitter Performance." IEEE Jornal of Solid-State Circuits, vol. 35, No. 3, Mar. 2000. pp. 377-384.

Roon, Tony van, "Phase-Locked Loops." Phase-Locked Loop Tutorial, PLL. Copyright 2001, Last updated: Sep. 27, 2005. Downloaded http://www.uoguelph.ca/-antoon/gadgets/pll/pl.html. 10 pages.

Yasyda, Takeo, et al., "A Dynamically Phase Adjusting PLL with a Variable Delay." IEEE 2001. pp. 275-280.

Zilic, Zelijko, "Phase- and Delay-Locked Loop Clock Control in Digital Systems." TechOnLine Publication. Dated: Aug. 17, 2001. 4 pages.

* cited by examiner

CLOCK DISTRIBUTION NETWORK SUPPORTING LOW-POWER MODE

FIELD OF THE INVENTION

The present invention relates generally to the field of communications, and more particularly to high speed electronic signaling within and between integrated circuit devices.

BACKGROUND

FIG. 1 (prior art) depicts a type of clock distribution network 100 commonly used to source clock signals in complex, high-speed integrated circuits. Network 100 includes a phase-locked loop (PLL) 105, a clock-enable multiplexer 110, and a clock network 115. In operation, PLL 105 generates a stable clock signal CLK from a reference clock signal REF. When clock-enable signal CLKEN is asserted, multiplexer 110 conveys clock signal CLK to network 100 for distribution to a plurality of clock destination nodes CD[0:N].

PLL 105 includes a phase detector 120, a low-pass filter 125, and a voltage-controlled oscillator (VCO) 130. A feedback path extending between the output of VCO 130 and one of two input terminals of phase detector 120 conveys a feedback signal SENSE derived from clock signal CLK. Phase detector 120 compares the phase of feedback signal SENSE with that of reference signal REF and produces a phase-error signal PE based upon this comparison. Low-pass filter 125 then presents a filtered version of the phase-error signal as an input voltage V to VCO 130. The frequency of signal CLK is proportional to voltage V, so phase detector 120 controls clock signal CLK via filter 125 to maintain a fixed phase relationship between signals SENSE and REF.

The feedback path of PLL 105 optionally includes a divider 135, the effect of which is to multiply the frequency of clock signal CLK with respect to reference signal REF. A delay element 140 (e.g., a buffer) included in the feedback path is selected such that the delay through the feedback path is substantially the same as the delay through each clock path extending from VCO 130 to the various destination nodes CD[0:N]. Each clock branch includes one or a series of clock buffers that are collectively represented using a single buffer 145 in each path. Delay element 140 and buffers 145 can be carefully designed such that the delay through the feedback path of PLL 105 matches the delay through the various clock paths. In that case, signal SENSE should have a fixed phase and frequency relationship with respect to the distributed clock signals at destination nodes CD[0:N].

Broadcasting clock signals can consume considerable power, particularly for high-speed systems in which there are many destination nodes. Network 115 therefore employs multiplexer 110 to selectively disable the distribution of clock signal CLK to destination nodes CD[0:N] when the synchronous elements served by the distributed clock signals are inactive. Clock signals to a transmitter may be delivered only when the transmitter is in use, for example. Asserting clock-enable signal CLKEN connects the output of PLL 105 to clock network 115, and thus conveys clock signal CLK to destination nodes CD[0:N]. Deasserting signal CLKEN couples the inputs of buffers 145 to ground.

At start-up, such as when power is first applied to network 100, PLL 105 requires some time to lock feedback signal SENSE to reference signal REF. To avoid undesirable performance delays, PLL 105 maintains the lock condition irrespective of whether clock-enable signal CLKEN is asserted.

The destination clock signals should be synchronized to reference signal REF, which will be the case if the delay through clock network 115 matches the delay through delay element 140. It is therefore important that delay element 140 be carefully designed to replicate the behavior of buffers 145. Such behavior matching can be difficult in practice, however, because process, voltage, and temperature can each vary from one region of an integrated circuit to the next, and each of these variables impacts speed performance.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
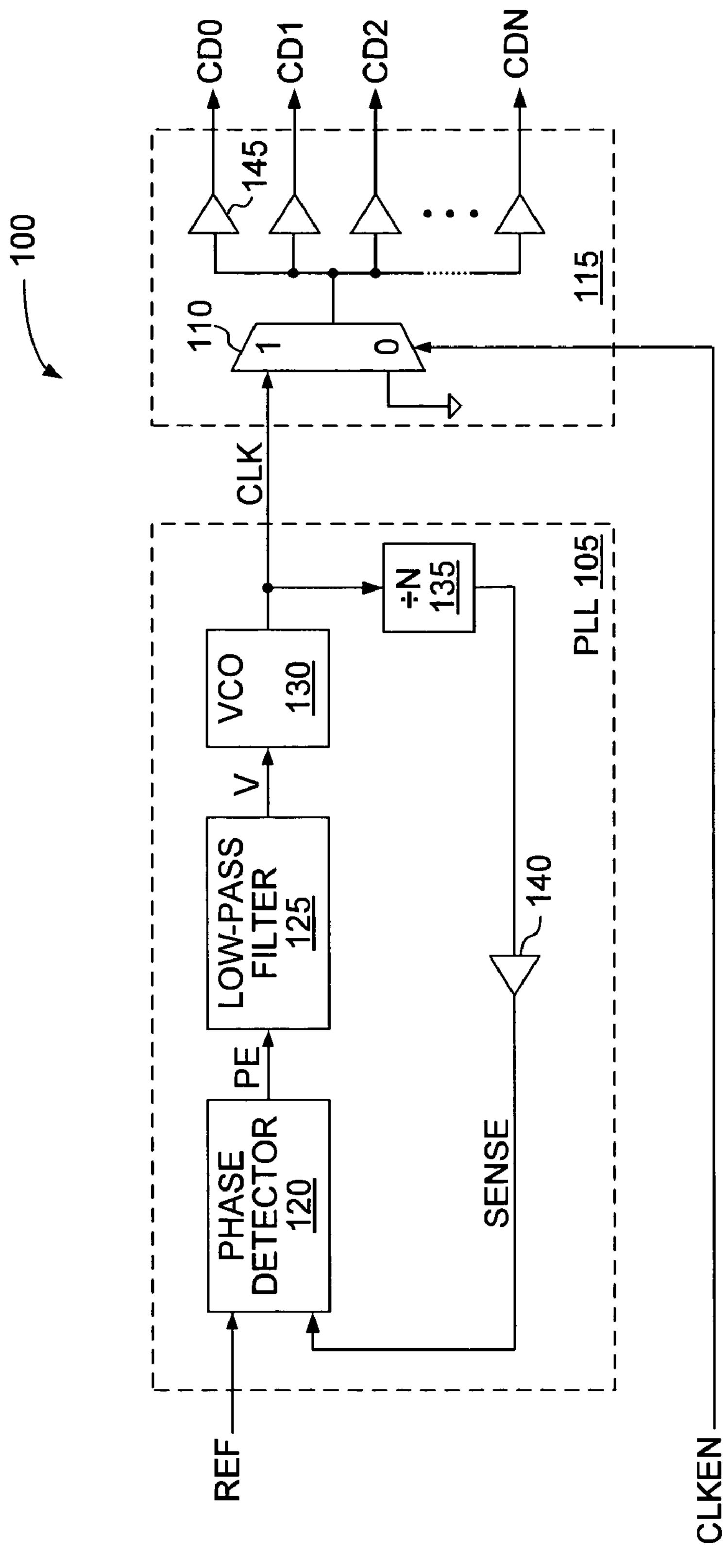
FIG. 1 (prior art) depicts a type of clock distribution network 100 commonly used to source clock signals in complex, high-speed integrated circuits.
Figure 2:
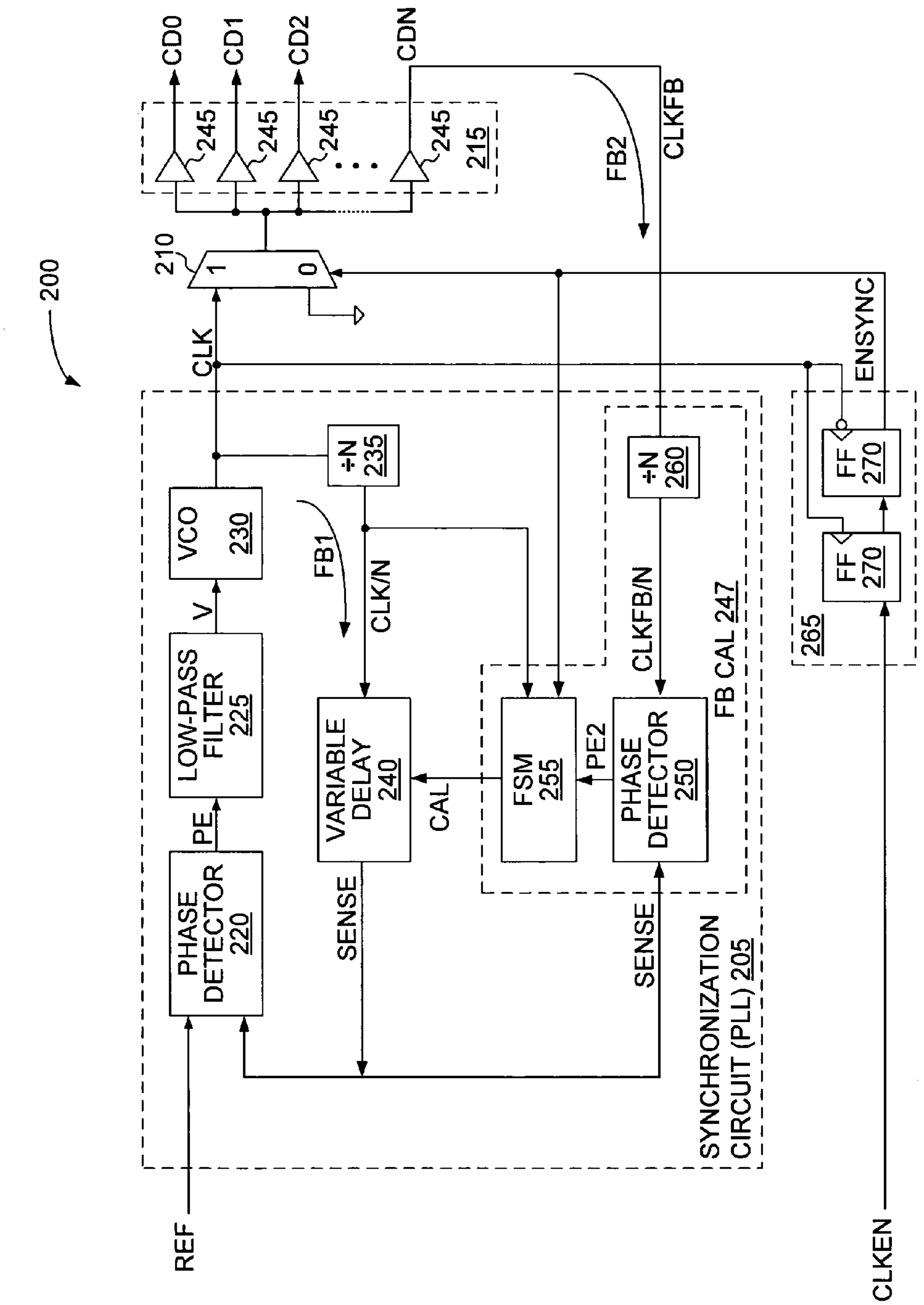
FIG. 2 depicts a clock distribution network 200 in accordance with one embodiment.

FIG. 2 depicts a clock distribution network 200 in accordance with one embodiment. Network 200 includes a synchronization circuit 205, a clock-enable multiplexer 210, and a clock network 215 (e.g. a clock tree) that together create and distribute a local clock signal CLK to a plurality of destination nodes CD[0:N]. Synchronization circuit 205 generates local clock signal CLK from a reference clock signal REF. When clock-enable signal CLKEN is asserted, multiplexer 210 conveys clock signal CLK to network 215, which distributes clock signal CLK to a plurality of clock destination nodes CD[0:N] as a corresponding plurality of distributed clock signals.

In accordance with the depicted embodiment, local clock signal CLK is synchronized with reference clock signal REF using two feedback loops, or paths, FB1 and FB2. The delay through first feedback path FB1 is calibrated to match the delay through clock network 215 and to maintain the phase relationship between local clock signal CLK and reference clock signal REF. This first feedback path is active irrespective of whether clock distribution is enabled (i.e., whether signal CLKEN is asserted). Second feedback path FB2 is used to recalibrate the delay through first feedback path FB1 whenever clock distribution is enabled. Calibrating and periodically recalibrating first feedback path FB1 maintains the phase relationship between the reference clock and the distributed clock in the face of process, voltage, and temperature (PVT) fluctuations that might otherwise hinder device performance.

Synchronization circuit 205, a PLL in this example, includes a phase detector 220, a low-pass filter 225, and a VCO 230. Feedback path FB1 extends between the output of VCO 230 and one of two input nodes of phase detector 220 and conveys feedback signal SENSE derived from clock signal CLK. Phase detector 220 compares the phase of feedback signal SENSE with that of reference signal REF and produces a phase-error signal PE based upon this comparison. Low-pass filter 225 then presents a filtered version of the phase-error signal as an input voltage V to VCO 230. The frequency of signal CLK is proportional to voltage V, so phase detector 220 controls the frequency of clock signal CLK via filter 225 to maintain a fixed phase relationship between signals SENSE and REF. Synchronization circuit 205 need not be a PLL, but may instead by e.g. a delay-locked loop (DLL), a multiplying DLL, or an injection-locked loop. Other suitable synchronization circuits are well known to those skilled in the art.

Feedback path FB1 optionally includes a divider 235, the effect of which is to multiply the frequency of clock signal CLK with respect to reference signal REF. A variable delay element 240 included in feedback path FB1 is selected such that the delay through the feedback path is substantially the same as the delay through each clock path extending from VCO 230 to the various destination nodes CD[0:N]. Each branch of clock network 215 includes one or a series of clock buffers that are collectively represented using a single buffer 245 in each path. As detailed below, the delay through delay element 240 can be calibrated to more closely replicate the delays through the branches of clock network 215, each of which extends from a root node at the output of multiplexer 210 to a respective one of destination nodes CD[0:N]. Though not shown, feedback path FB1 can include additional fixed delay elements that together with delay element 240 match the delay through the branches of network 215. Feedback path FB2 can be taken from a single destination node, as shown, or the feedback signal can be derived by combining the distributed signals from two or more destination nodes. In one embodiment, for example, a feedback node is coupled to all or a subset of destination nodes CD[0:N] via respective resistors such that the feedback clock signal is an average of a plurality of distributed clock signals.

Synchronization circuit 205 includes feedback-calibration circuitry 247 to calibrate the delay through delay element 240. When clock distribution is enabled, calibration circuitry 247 compares the phase of a feedback signal CLKFB from an output of clock network 215 with signal SENSE from variable delay element 240. If feedback paths FB1 and FB2 exhibit identical delays, as is desired in this example, then signals SENSE and CLKFB will be in phase; in that case, calibration signal CAL from calibration circuitry 247 is already set correctly, and is therefore left alone. If the feedback paths FB1 and FB2 are mismatched, however, calibration circuitry 247 will detect a phase mismatch between signals SENSE and CLKFB, and will adjust calibration signal CAL up or down as appropriate to reduce the phase mismatch. The resulting delay change through delay element 240 will introduce a phase error between signal SENSE and reference signal REF, which synchronization circuit 205 will quickly cancel via feedback path FB1.

Both feedback paths FB1 and FB2 are active so long as clock-enable signal CLKEN is asserted. In equilibrium, feedback path FB1 will lock the phase of reference clock REF to signal SENSE, and consequently to local clock signal CLK, and feedback path FB2 will lock the phase of feedback signal CLKFB and signal SENSE. Because both local clock signal CLK and feedback signal CLKFB are locked to signal SENSE, they have a fixed phase relationship with respect to one another. In other embodiments, the input ports of phase detector 250 may be coupled to lines CLK/N and CLKFB/N.

Calibration circuitry 247 includes a phase detector 250 and a finite state machine (FSM) 255. If feedback loop FB1 includes a clock divider, as in this example, calibration circuitry 247 may likewise include a clock divider 260. Phase detector 250 compares the phase of signal SENSE with divided feedback signal CLKFB/N and issues phase-error signals PE2 indicative of any phase error. FSM 255 periodically adjusts calibration signal CAL in response to phase-error signals PE2 when clock distribution is enabled.

First feedback path FB1 exhibits a high loop bandwidth, and may be as fast as practical. The loop bandwidth of the second feedback path FB2 and associated calibration circuitry 247 may be relatively low by comparison. In one embodiment, FSM 255 effectively reduces the loop bandwidth of the second feedback path by issuing updates to calibration signal CAL at most every tenth cycle of the divided local clock signal CLK/N. Feedback signal CLKFB is a clock signal in this embodiment, but may also be e.g. a sampled data signal from a synchronous element timed to a distributed clock signal.

FSM 255 and the switch state of multiplexer 210 are controlled by clock-enable signal CLKEN via a clock gate 265. Gate 265 includes a pair of synchronous storage elements (e.g. flip-flops) 270 timed to local clock signal CLK to issue a synchronous enable signal ENSYNC when signal CLKEN is asserted. Gate 265 synchronizes signal ENSYNC to prevent multiplexer 210 from issuing partial pulses of signal CLK when signal CLKEN is asserted or deasserted. Multiplexer 210 is one of many suitable types of switches available to those of skill in the art.

FSM 255 may be a simple counter and associated control logic, the purpose of which is to hold calibration signal CAL constant when signal ENSYNC is deasserted and to update calibration signal CAL as needed to recalibrate delay element 240 when signal ENSYNC is asserted. Variable delay element 240 can be implemented as a series of CMOS inverters. The delay through each inverter can be controlled by varying the available supply current. Many implementations are available, as is well known to those of skill in the art. In one embodiment, for example, VCO 230 provides multiple clock phases and variable delay element 240 is implemented using a phase interpolator.

Figure 3:
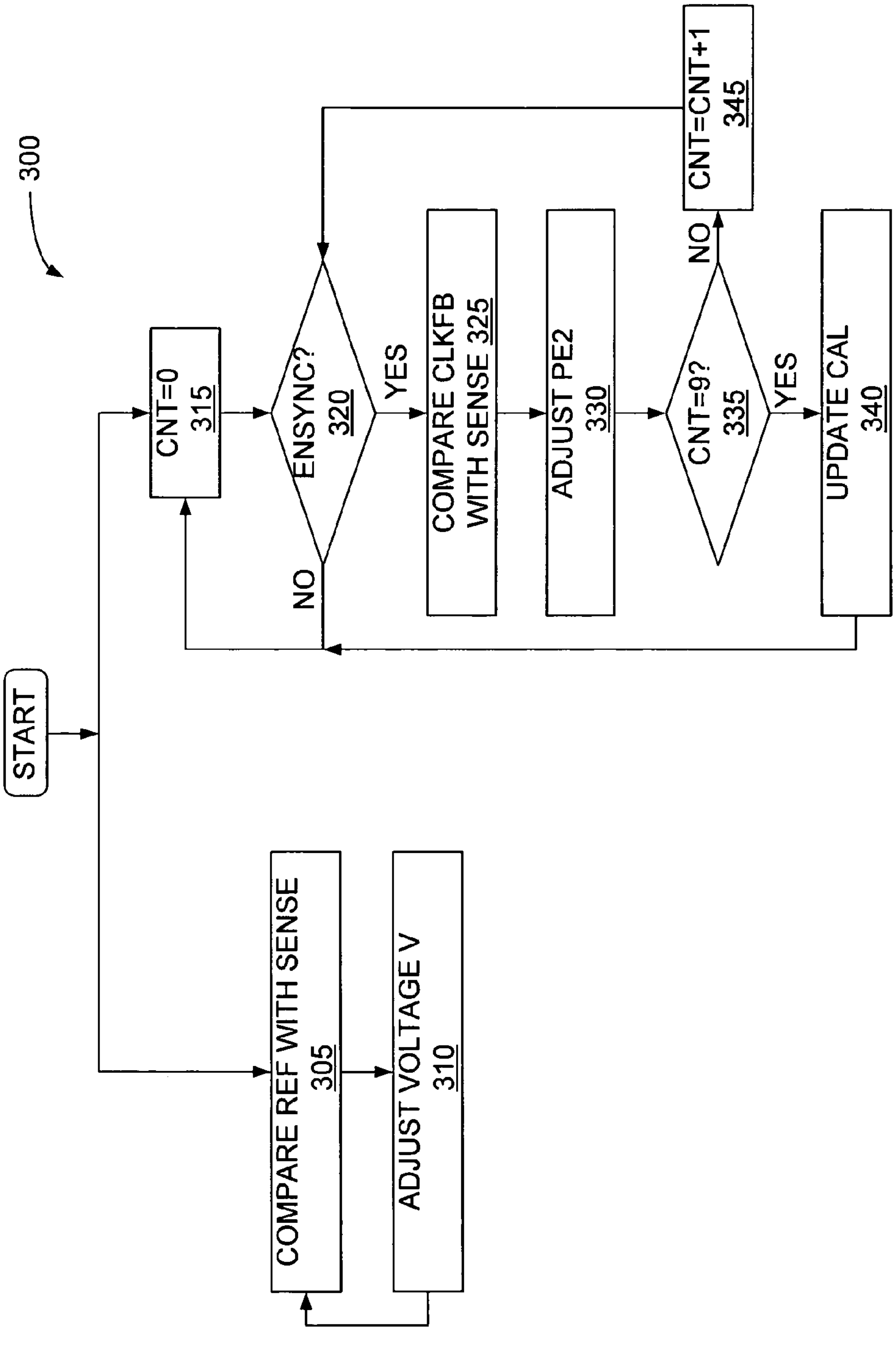
FIG. 3 is a flowchart 300 illustrating the operation of clock distribution network 200 of FIG. 2 in accordance with one embodiment.

FIG. 3 is a flowchart 300 illustrating the operation of clock distribution network 200 of FIG. 2 in accordance with one embodiment. Flowchart 300 includes left and right branches depicting the operation of the first and second feedback paths FB1 and FB2, respectively. Some of the steps in flowchart 300 may be carried out concurrently, but are depicted in sequence for ease of illustration.

Treating the left branch first, at start (e.g., at power-up), phase detector 220 begins comparing the phases of signals REF and SENSE (step 305). The combination of phase detector 220 and filter 225 then adjusts voltage V, and thereby the frequency of clock signal CLK, based on the outcome of this comparison (step 310). This aspect of synchronization circuit 205 is conventional, and continues without regard to operation of the second feedback loop.

Also at power up, a counter in FSM 255 is reset to zero (step 315). This counter (not shown) limits calibration updates to variable delay element 240 to e.g. once every ten clock cycles to reduce the loop bandwidth of the second feedback loop with respect to the first. Per decision 320, the counter remains set to zero so long as signal ENSYNC is deasserted. Once signal ENSYNC is asserted, clock pulses are produced at clock network 215, and comparisons of signals SENSE and CLKFB/N (step 325) will lead to adjustments in phase-error signal PE2 (step 330). If count CNT has reached nine (decision 335), then FSM 255 updates calibration signal CAL as directed by phase-error signal PE2 (step 340); otherwise, the count is incremented (step 345) and the process returns to decision 320. In this example, phase detector 250 is inactive when signal ENSYNC is deasserted. In other embodiments, phase detector 250 may be active irrespective of the state of signal ENSYNC, or may be activated only for specific count values (e.g., only when CNT=9). These and other options will be readily understood by those of skill in the art.

Figure 4:
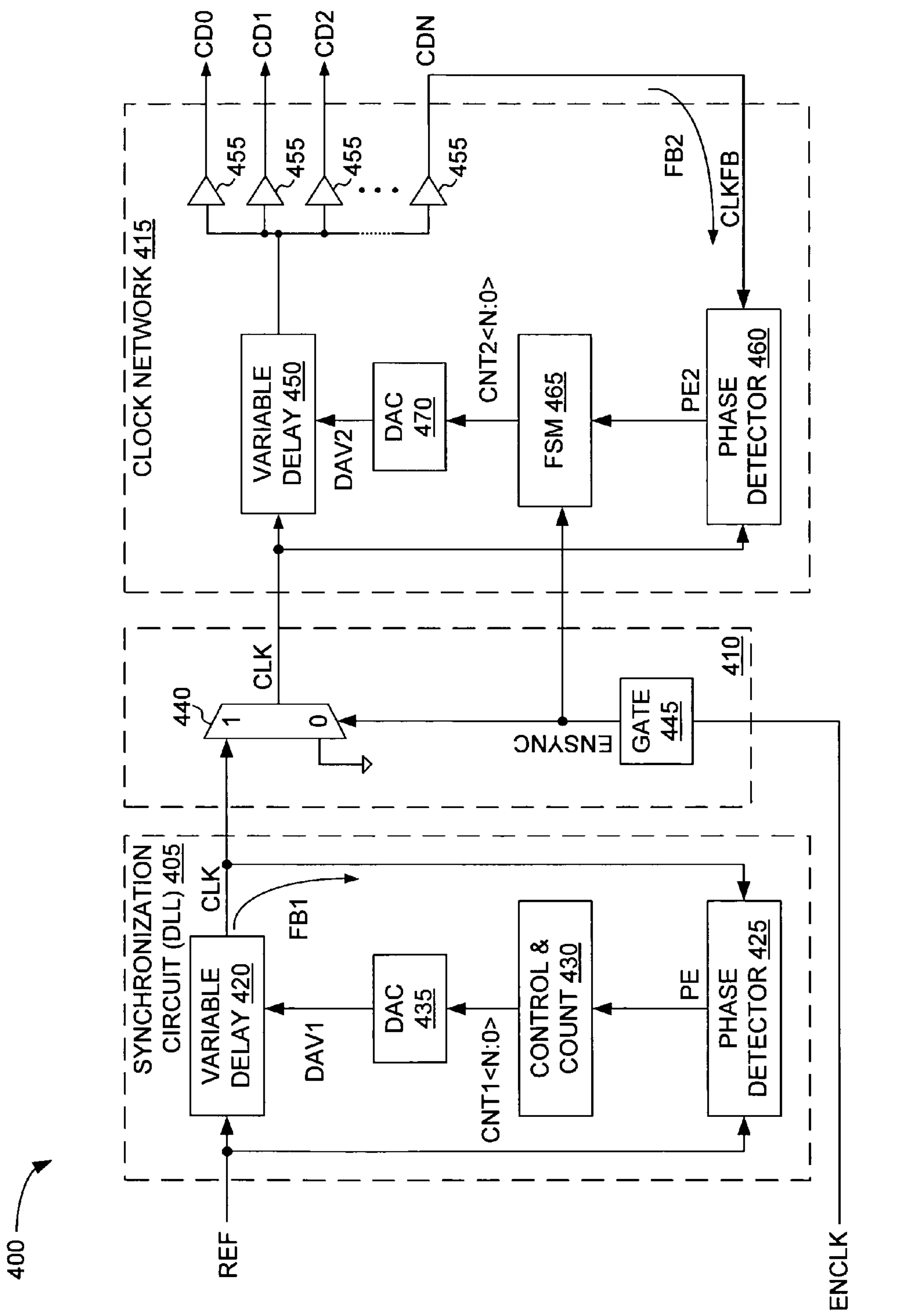
FIG. 4 depicts a clock distribution network 400 in accordance with another embodiment.

FIG. 4 depicts a clock distribution network 400 in accordance with another embodiment. Network 400 includes a synchronization circuit 405, clock-enable circuitry 410, and a clock network 415 that together create and distribute a clock signal CLK to a plurality of destination nodes CD[0:N]. To this end, synchronization circuit 405, a delay-locked loop (DLL) in this example, generates a stable clock signal CLK from a reference clock signal REF. When clock-enable signal ENCLK is asserted, clock-enable circuitry 410 conveys clock signal CLK to network 415, which distributes clock signal CLK to each of clock destination nodes CD[0:N].

Synchronization circuit 405 includes a variable delay element 420 that phase shifts reference clock REF by 360 degrees to produce local clock signal CLK. A phase detector 425 compares the phases of signals REF and CLK to generate a phase-error signal PE. The phase error signal feeds a counter and control circuit 430, which employs phase error signal PE to develop a binary count signal CNT1<N:0>. There are twelve count lines in one embodiment (N=11), but other embodiments may include more or fewer. Delay element 420 is voltage controlled in this example, so a digital-to-analog converter (DAC) 435 converts binary count signal CNT1<N:0> into an analog delay-adjust voltage DAV1.

Clock-enable circuitry 410 includes a multiplexer 440 and a gate 445 that work in the manner of multiplexer 210 and gate 265 of FIG. 2. Briefly, clock-enable circuitry 410 gates clock signal CLK in response to clock-enable signal ENCLK to reduce power consumption while the synchronous elements (not shown) associated with destination nodes CD[0:N] are inactive.

Clock network 415 includes variable and fixed delay elements 450 and 455, respectively. Clock network 415 may be designed such that the delays from the output of multiplexer 440 to each of the destination nodes are substantially equal and are integer multiples of the delay through delay element 420. In one embodiment, for example, the delay through each branch of clock network 415 phase shifts clock signal CLK from multiplexer 440 by 360 degrees, with variable delay element 450 contributing about 90 degrees of that delay.

Clock network 415 is essentially a second synchronization circuit, a DLL in this embodiment. When clock distribution is enabled (i.e., signal ENSYNC=1), clock network 415 adjusts the delay through delay element 450 such that local clock signal CLK from multiplexer 440 is in phase with a feedback signal CLKFB derived from one or more of the clock destination nodes. A phase detector 460 considers those two signals in producing a phase error signal PE2 to an FSM 465. FSM 465 derives a digital count signal CNT2<N:0> from the phase error signal. A DAC 470 converts the count to an analog voltage DAV2 that controls the delay through element 450. FSM 465 controls element 450 via DAC 470 until signals CLK and CLKFB are locked in phase. As in the example of FIG. 2, the feedback signal CLKFB might be e.g. a sampled data signal.

The DLL of clock network 415 exhibits a substantially lower loop bandwidth than DLL 405. In one embodiment, FSM 465 averages the phase error signals associated with ten clock edges to reduce the loop bandwidth relative to that of DLL 405. Other methods of adjusting loop bandwidth might also be used, as will be obvious to those of skill in the art.

In the foregoing description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments. As another example, circuits described or depicted as including metal oxide semiconductor (MOS) transistors may alternatively be implemented using bipolar technology or any other technology in which a signal-controlled current flow may be achieved. With respect to terminology, a signal is said to be "asserted" when the signal is driven to a low or high logic state (or charged to a high logic state or discharged to a low logic state) to indicate a particular condition. Conversely, a signal is said to be "de-asserted" to indicate that the signal is driven (or charged or discharged) to a state other than the asserted state (including a high or low logic state, or the floating state that may occur when the signal driving circuit is transitioned to a high impedance condition, such as an open drain or an open collector condition). A signal driving circuit is said to "output" a signal to a signal receiving circuit when the signal driving circuit asserts (or de-asserts, if explicitly stated or indicated by context) the signal on a signal line coupled between the signal driving and signal receiving circuits. A signal line is said to be "activated" when a signal is asserted on the signal line, and "deactivated" when the signal is de-asserted.

An output of a process for designing an integrated circuit, or a portion of an integrated circuit, comprising one or more of the circuits described-herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein.

While the present invention has been described in connection with specific embodiments, variations of these embodiments will be obvious to those of ordinary skill in the art. For example, while the foregoing examples show a tree-structure, the term "clock network" is intended to apply equally to any number of other clock structures, such as clock grids.

Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. §112.

What is claimed is:

1. A clock network comprising:

a synchronization circuit to maintain a first phase relationship between a local clock signal and a reference clock signal;

a clock switch to selectively enable and disable distribution of the local clock signal;

a clock network having at least one clock branch extending from the root node to a clock-destination node to distribute the local clock signal as a distributed clock signal when the clock switch enables distribution; and a feedback path extending from the destination node to the synchronization circuit to convey the distributed clock signal to the synchronization circuit;

wherein the synchronization circuit maintains the first phase relationship when the clock switch disables distribution of the local clock signal and updates the first phase relationship based on a comparison of the distributed clock signal with the reference clock signal when the clock switch enables clock distribution.

2. The clock network of claim 1, the synchronization circuit including a phase detector and a second feedback path to feed back the local clock signal as a sense signal, the phase detector to detect a phase difference between the reference clock signal and the sense signal.

3. The clock network of claim 2, the second feedback path including a variable delay element.

4. The clock network of claim 3, further comprising a second phase detector to calibrate the variable delay element.

5. The clock network of claim 2, the synchronization circuit further including a second phase detector to detect phase a second phase difference between the sense signal and the reference clock signal.

6. The clock network of claim 5, the synchronization circuit further including a second feedback path to feed the local clock signal to the first phase detector, the second feedback path including a variable delay element.

7. The clock network of claim 6, wherein an output node of the second phase detector is coupled to a calibration node of the variable delay element.

8. A method of controlling a clock signal, the method comprising:

deriving a local clock signal from a reference clock signal;

selectively enabling distribution of the local clock signal to a clock destination node and, during distribution, synchronizing a distributed clock signal derived from the clock destination node with the reference clock signal; and selectively blocking the distribution of the local clock signal to the clock destination node and, while blocking the distribution, synchronizing the local clock signal with the reference clock signal.

9. The method of claim 8, wherein deriving the local clock signal includes phase aligning the local clock signal with the reference clock signal.

10. The method of claim 8, further comprising synchronizing the local clock signal with the reference clock signal during distribution of the local clock signal.

11. A clock distribution network comprising:

a phase-locked loop to maintain a first phase relationship between a reference-clock signal and a local clock signal;

a clock switch to selectively convey the local clock signal;

a clock network having a plurality of clock branches extending from a root node to a plurality of clock-destination nodes wherein the clock network conveys the local clock signal as a distributed clock signal when the clock switch enables distribution of the local clock signal; and a feedback path coupled between at least one of the clock-destination nodes and the phase locked loop;

wherein the phase-locked loop simultaneously maintains the first phase relationship and a second phase relationship between the reference clock signal and the distributed clock signal.

12. The clock distribution network of claim 11, the phase-locked loop further comprising a phase detector to detect the second phase relationship.

13. The clock distribution network of claim 11, the phase-locked loop further comprising:

a phase detector;

a filter coupled to the phase detector; and a voltage-controller oscillator coupled to the filter.

14. The clock distribution network of claim 13, further comprising a variable delay element in the first feedback path.

15. The clock distribution network of claim 14, further comprising a second phase detector to detect the second phase relationship and to issue a phase-error signal to control the variable delay element.

16. A computer-readable medium having stored thereon a data structure defining a clock distribution network, the data structure comprising:

first data representing a synchronization circuit to maintain a first phase relationship between a local clock signal and a reference clock signal and a second phase relationship between a distributed clock signal and the reference clock signal;

second data representing a clock switch coupled to the synchronization circuit to selectively enable and to selectively disable distribution of the local clock signal;

third data representing a clock network having a root node, coupled to the switch, and a plurality of clock branches extending from the root node to a plurality of clock destination nodes, wherein the clock network conveys the local clock signal as the distributed clock signal when the clock switch enables distribution of the local clock signal; and fourth data representing a feedback path extending from at least one of the destination nodes to the synchronization circuit to convey the distributed clock signal to the synchronization circuit;

wherein the synchronization circuit maintains the first phase relationship when the clock switch disables distribution of the local clock signal and maintains the second phase relationship between the distributed clock signal and the reference clock signal when the clock switch enables clock distribution.

17. The medium of claim 16, wherein the synchronization circuit includes a phase detector to detect the first phase relationship.

18. The medium of claim 16, wherein the synchronization circuit includes a second feedback path to convey the local clock signal to the phase detector.

19. The medium of claim 16, wherein the synchronization circuit includes a second phase detector to detect the second phase relationship.

* * * * *